(12) United States Patent
Straussberger et al.

(10) Patent No.: US 11,351,489 B2
(45) Date of Patent: Jun. 7, 2022

(54) RETROFITTABLE NO FILTER NO RUN FILTRATION SYSTEM

(71) Applicant: CUMMINS FILTRATION IP, INC., Columbus, IN (US)

(72) Inventors: Mark D. Straussberger, Algood, TN (US); Pravin Shantinath Kadam, Kolhapur (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 152 days.

(21) Appl. No.: 16/923,217

(22) Filed: Jul. 8, 2020

(65) Prior Publication Data

US 2020/0338482 A1 Oct. 29, 2020

Related U.S. Application Data

(62) Division of application No. 15/537,588, filed as application No. PCT/US2015/066979 on Dec. 21, 2015, now Pat. No. 10,710,009.

(Continued)

(51) Int. Cl.
*B01D 35/157* (2006.01)
*B01D 35/30* (2006.01)
*B01D 35/14* (2006.01)

(52) U.S. Cl.
CPC ......... *B01D 35/1573* (2013.01); *B01D 35/14* (2013.01); *B01D 35/30* (2013.01);
(Continued)

(58) Field of Classification Search
CPC .... B01D 35/1573; B01D 35/14; B01D 35/30; B01D 2201/16; B01D 2201/295; B01D 2201/4061
See application file for complete search history.

(56) References Cited

U.S. PATENT DOCUMENTS 2,676,708 A 4/1954 Risk
4,125,469 A 11/1978 Henton et al.
(Continued)

FOREIGN PATENT DOCUMENTS

CN 206419137 8/2018
WO WO-2016/018673 2/2016
(Continued)

OTHER PUBLICATIONS

International Search Report and Written Opinion from corresponding PCT Application No. PCT/US2017/067293, dated Mar. 8, 2018, pp. 1-7.
(Continued)

*Primary Examiner* — Liam Royce
(74) *Attorney, Agent, or Firm* — Foley & Lardner LLP

(57) ABSTRACT

A retrofit no filter no run insert for existing filtration systems manufactured without a no filter no run engine integrity protection feature. The insert is beneficial for a manufacturer that initially does not require the benefit of a no filter no run engine integrity protection feature but later requires such a feature. The insert can be installed into the existing filtration system without any modification to the existing filtration system head. The no filter no run insert prevents the equipment supplied by the filtration system (e.g., an internal combustion engine) from being operated without a filter element. Further, the no filter no run insert prevents the equipment supplied by the filtration system from being operated with an unauthorized or non-genuine replacement filter element. The no filter no run insert safeguards against damage to downstream components of the filtration system and malfunctions of equipment in which the filtration system is used.

11 Claims, 5 Drawing Sheets

Related U.S. Application Data

(60) Provisional application No. 62/095,283, filed on Dec. 22, 2014.

(52) U.S. Cl.
CPC .... *B01D 2201/16* (2013.01); *B01D 2201/295* (2013.01); *B01D 2201/4061* (2013.01)

(56) References Cited

U.S. PATENT DOCUMENTS

| | | | |
|---|---|---|---|
| 4,192,751 A | | 3/1980 | Henton et al. |
| 4,300,517 A | | 11/1981 | Astansky et al. |
| 4,465,595 A | * | 8/1984 | Cooper .................. B01D 35/30 |
| | | | 210/238 |
| 5,736,040 A | | 4/1998 | Duerrstein et al. |
| 5,846,417 A | | 12/1998 | Jiang et al. |
| 6,068,763 A | | 5/2000 | Goddard |
| 6,884,349 B1 | | 4/2005 | Jiang |
| 8,517,183 B2 | | 8/2013 | Thomas et al. |
| 10,710,009 B2 | | 7/2020 | Straussberger et al. |
| 2008/0179236 A1 | | 7/2008 | Wieczorek et al. |
| 2009/0020465 A1 | | 1/2009 | Jiang et al. |
| 2011/0073538 A1 | | 3/2011 | Jiang et al. |
| 2012/0024771 A1 | * | 2/2012 | Abdalla ................ B01D 29/21 |
| | | | 210/234 |
| 2013/0081996 A1 | | 4/2013 | Kamp et al. |
| 2013/0118974 A1 | | 5/2013 | Hacker |
| 2014/0124459 A1 | | 5/2014 | Li et al. |
| 2015/0273369 A1 | | 10/2015 | Le Ven et al. |
| 2016/0018673 A1 | | 1/2016 | Wang |

FOREIGN PATENT DOCUMENTS

| | | |
|---|---|---|
| WO | WO-2017/155974 | 9/2017 |
| WO | WO-2016/036730 | 3/2019 |

OTHER PUBLICATIONS

Office Action for IN Patent Application No. 201747016933, dated Apr. 23, 2019, 5 pages.

U.S. Office Action on U.S. Appl. No. 16/473,476 dated Dec. 4, 2020.

Non-Final Office Action issued for U.S. Appl. No. 16/473,476, dated Apr. 14, 2021, 28 pages.

Final Office Action from U.S. Appl. No. 15/537,588, dated Nov. 25, 2019.

International Search Report and Written Opinion issued for PCT/US2015/066979, dated Feb. 25, 2016, 14 pages.

Non-Final Office Action from U.S. Appl. No. 15/537,588, dated Aug. 14, 2019.

Notice of Allowance from U.S. Appl. No. 15/537,588, dated Mar. 12, 2020.

* cited by examiner

ABSTRACT# RETROFITTABLE NO FILTER NO RUN FILTRATION SYSTEM

CROSS-REFERENCE TO RELATED APPLICATIONS

This application is a divisional of U.S. patent application Ser. No. 15/537,588, filed on Jun. 19, 2017, which is the U.S. National Phase of PCT Application No. PCT/US2015/066979, filed on Dec. 21, 2015, which claims priority to U.S. Provisional Patent Application No. 62/095,283, entitled, "RETROFITTABLE NO FILTER NO RUN FILTRATION SYSTEM," filed on Dec. 22, 2014, which are herein incorporated by reference in their entireties and for all purposes.

TECHNICAL FIELD

The present disclosure relates generally to filtration systems having a replaceable filter element.

BACKGROUND

Internal combustion engines generally combust a mixture of fuel (e.g., gasoline, diesel, natural gas, etc.) and air. Prior to entering the engine, fluids, such as fuel and oil, are typically passed through filter elements to remove contaminants (e.g., particulates, dust, water, etc.) from the fluids prior to delivery to the engine. The filter elements require periodic replacement as the filter media of the filter elements captures and removes the contaminants from the fluids passing through the filter media. In some cases, unauthorized or non-genuine replacement filter elements may be installed in the filtration systems during servicing operations. The unauthorized and non-genuine replacement filter elements may be of inferior quality to genuine, authorized filter elements. Thus, the use of unauthorized or non-genuine replacement filter elements may cause damage to the engine by allowing contaminants past the filter element.

Some engine and filtration system implement various engine integrity protection features, such as the implementation of no filter no run systems. In a no filter no run system (also referred to as a "NFNR" system), the engine will either not run or run in a limited capacity (e.g., in a limp mode) if an unauthorized or non-genuine replacement filter element is installed in the filtration system. However, many engine and filtration systems are not equipped with such engine integrity protection features. These engine and filtration systems are therefore susceptible to damage if used with unauthorized or non-genuine replacement filter elements.

SUMMARY

One example embodiment relates to an no filter no run insert. The no filter no run insert includes a cage housing sized and shaped to be received in a filter mounting head of a filtration system not designed with a no filter no run feature. The no filter no run insert includes a cutoff valve including a ball having a ball diameter and a fluid passage having a fluid passage diameter. The ball diameter is greater than the fluid passage diameter such that ball will block the fluid passage as the fluid is being filtered by the assembly carries the ball into the fluid passage unless a filter element having a valve interaction pin is used within the filtration system. Accordingly, when the plastic cage housing is received in the filter mounting head, the no filter no run insert provides a retrofit no filter no run feature to the filtration system.

Another example embodiment relates to a filtration system. The filtration system includes a mounting head having a fluid inlet and a fluid outlet. The filtration system further includes a housing coupled to the mounting head. The filtration system includes a no filter no run insert positioned in the filter mounting head. The no filter no run insert includes a plastic cage housing sized and shaped to be received in the filter mounting head. The no filter no run insert also includes a cutoff valve including a ball having a ball diameter and a fluid passage having a fluid passage diameter. The ball diameter is greater than the fluid passage diameter such that ball will block the fluid passage as the fluid is being filtered carries the ball into the fluid passage unless a filter element having a valve interaction pin is used within the filtration system.

A further example embodiment relates to a method of converting a filtration system to no filter no run filtration system. The method includes providing a filtration system that does not include a no filter no run feature. The method further includes providing a no filter no run insert having a cutoff valve. The method includes inserting the no filter no run insert into a fluid passageway of a mounting head of the filtration system.

These and other features, together with the organization and manner of operation thereof, will become apparent from the following detailed description when taken in conjunction with the accompanying drawings.

DETAILED DESCRIPTION

Referring to the figures generally, a retrofit no filter no run insert for existing filtration systems manufactured without a no filter no run engine integrity protection (also referred to as EIP) feature is depicted. The insert is beneficial for a manufacturer that initially does not require the benefit of a no filter no run engine integrity protection feature but later requires such a feature. The insert can be installed into the existing filtration system without any modification to the existing filtration system head. The no filter no run insert prevents the equipment supplied by the filtration system (e.g., an internal combustion engine) from being operated without a filter element. Further, the no filter no run insert prevents the equipment supplied by the filtration system from being operated with an unauthorized or non-genuine replacement filter element. The no filter no run insert safeguards against damage to downstream components of the filtration system and malfunctions of equipment in which the filtration system is used.

Figure 1A:
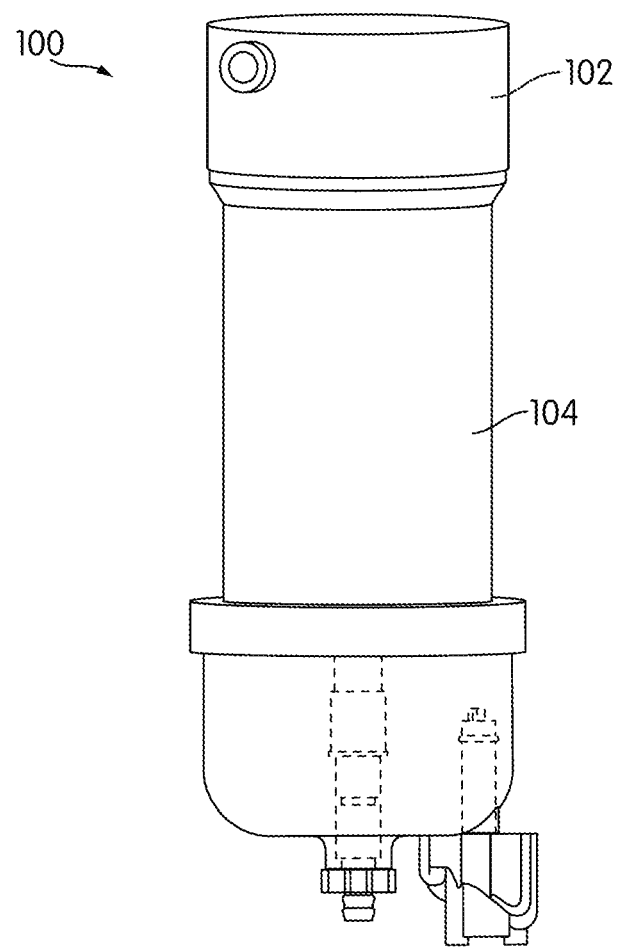
FIG. 1A is a perspective view of a filter assembly according to an exemplary embodiment.
Figure 1B:
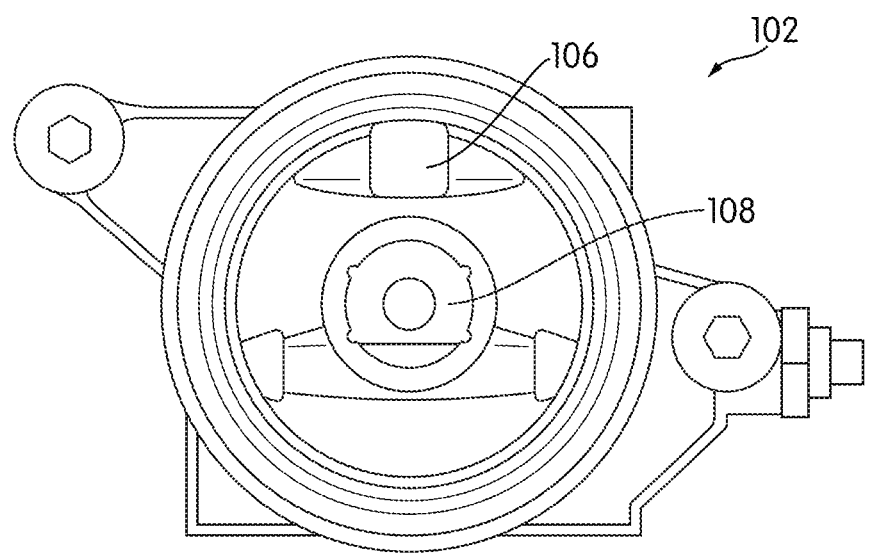
FIG. 1B is a bottom view of the filter mounting head of the filter assembly of FIG. 1A.

Referring to FIG. 1A, a perspective view of a filter assembly 100 is shown according to an exemplary embodiment. The filter assembly 100 receives filters a fluid (e.g., fuel, oil, hydraulic fluid, water, etc.) and provides filtered fluid to a system, such as an internal combustion engine. The filter assembly 100 includes a mounting head 102 and a housing 104. The housing 104 is removably coupled to the mounting head 102 (e.g., via a threaded connection). The housing 104 in FIG. 1A is a cylindrical shell housing. The housing 104 houses a filter element. The mounting head 102 includes a fluid inlet 106 (as shown in FIG. 1B) that provides unfiltered fluid to the housing 104 and to the filter element. The mounting head 102 also includes a fluid outlet 108 (as shown in FIG. 1B) that receives filtered fluid from the filter element. The fluid outlet provides filtered fluid to the system. Referring to FIG. 1B, a bottom view of the filter mounting head 102 is shown according to an exemplary embodiment. The filter mounting head 102 does not include a no filter no run engine integrity protection feature, such as a valve in the fluid outlet 108.

Figure 2:
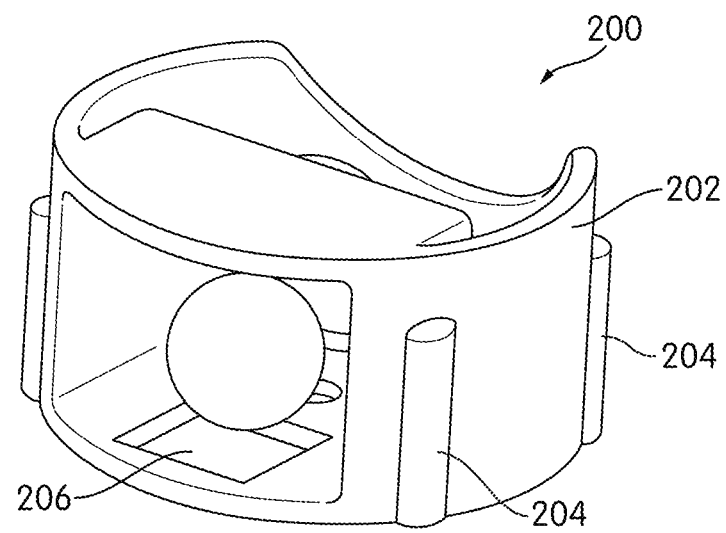
FIG. 2 is a perspective view of a no filter no run insert is shown according to an exemplary embodiment

Referring to FIG. 2, a perspective view of an no filter no run insert 200 is shown according to an exemplary embodiment. The no filter no run insert 200 includes a cage 202. In some arrangements, the cage 202 includes alignment ribs 204. The cage 202 includes a fluid inlet 206. The fluid inlet allows fluid being filtered by the filtration system to flow into the cage 202 (as described in further detail below with respect to FIG. 3). The fluid inlet 206 is sized and shaped to permit a valve interaction pin (e.g., pin 508) to extend through the fluid inlet 206. The cage 202 may be formed from plastic.

Figure 3:
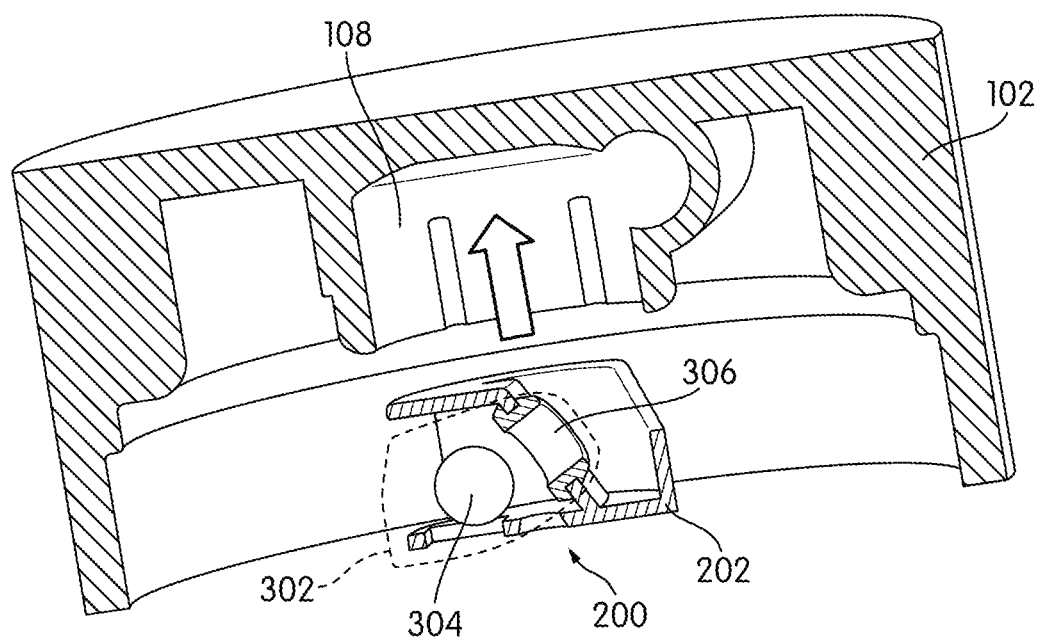
FIG. 3 is a view of the no filter no run insert of FIG. 2 being inserted into the filter mounting head of FIG. 1B.

As shown in FIG. 3, the cage 202 is sized and shaped to be received within the fluid outlet 108 of the filter mounting head 102. In an alternative arrangement, the no filter no run insert 200 may be sized and shaped to be inserted into a different fluid passageway, such as the fluid inlet 106 or another fluid conduit. When the no filter no run insert 200 is inserted into the fluid outlet 108 of the filter mounting head 102, the no filter no run forms a snap fit or friction fit connection between the cage 202 and the fluid outlet 108. The cage 202 seals against the filter mounting head 102 via a plastic to metal interference seal. The no filter no run insert 200 includes a cutoff valve 302. The cutoff valve 302 is comprised of a ball 304 and a fluid passage 306. The fluid passage 306 is positioned downstream of the fluid inlet 206 in a fluid flow direction. The ball 304 has a larger diameter than the fluid passage 306. Additionally, the ball 304 is sized such that the ball 304 cannot pass through the fluid inlet 206. The ball 304 is positioned between the fluid inlet 206 and the fluid passage 306 in the fluid flow direction. In some arrangements, the ball 304 is of a lesser density than the fluid filtered by the filter assembly 100. Accordingly, the ball 304 will block the fluid passage 306 as fluid is being filtered by the filter assembly 100. Thus, once installed, the no filter no run insert 200 causes the filtration system to only function properly with an appropriate filter element installed that prevents the ball 304 from blocking the passage 306 (e.g., as described below with respect to FIGS. 5 and 6).

Thus, the no filter no run insert 200 is a retrofit solution for filtration systems not originally designed with a no filter no run engine integrity protection feature. The no filter no run insert 200 can be inserted into these filtration systems without modification to the filter mounting head 102. The no filter no run insert 200 will assist in preventing possible system (e.g., internal combustion engine) damage that may be caused by unauthorized or non-genuine filter elements being installed in the filtration system 100. This engine integrity protection feature reduces or eliminates warranty claims related to the filtration system 100.

Figure 4:
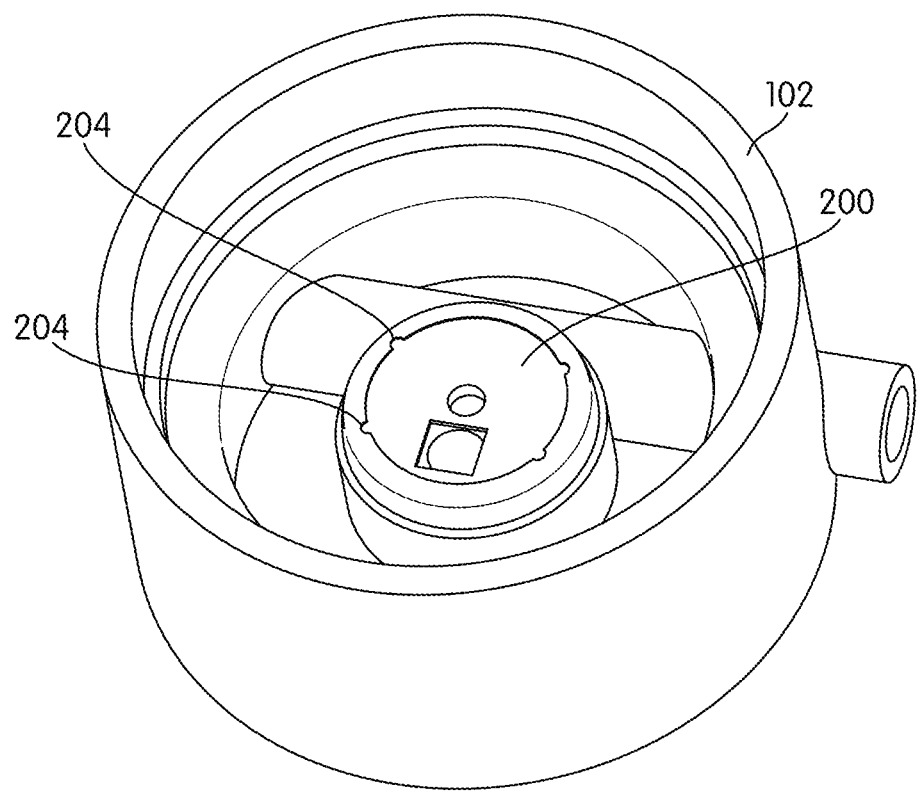
FIG. 4 is a bottom perspective view of the no filter no run insert of FIG. 2 fully inserted into the filter mounting head of FIG. 1B.

As shown in FIG. 4, when the no filter no run insert 200 is fully inserted into the fluid outlet 108 of the filter mounting head 102, the surface of the cage 202 is flush with the surface of the fluid outlet 108. The alignment ribs 204 interact with slots built into the filter mounting head 102 to ensure that the valve 302 properly aligns with the fluid outlet 108 to ensure that filtered fluid flows through the filter mounting head 102. Once the no filter no run insert 200 is fully inserted into the fluid outlet 108 of the filter mounting head 102, the no filter no run insert 200 sits flush with the surrounding surfaces of the filter mounting head 102, resulting in a tamper proof design that makes the no filter no run insert 200 difficult to remove.

Figure 5:
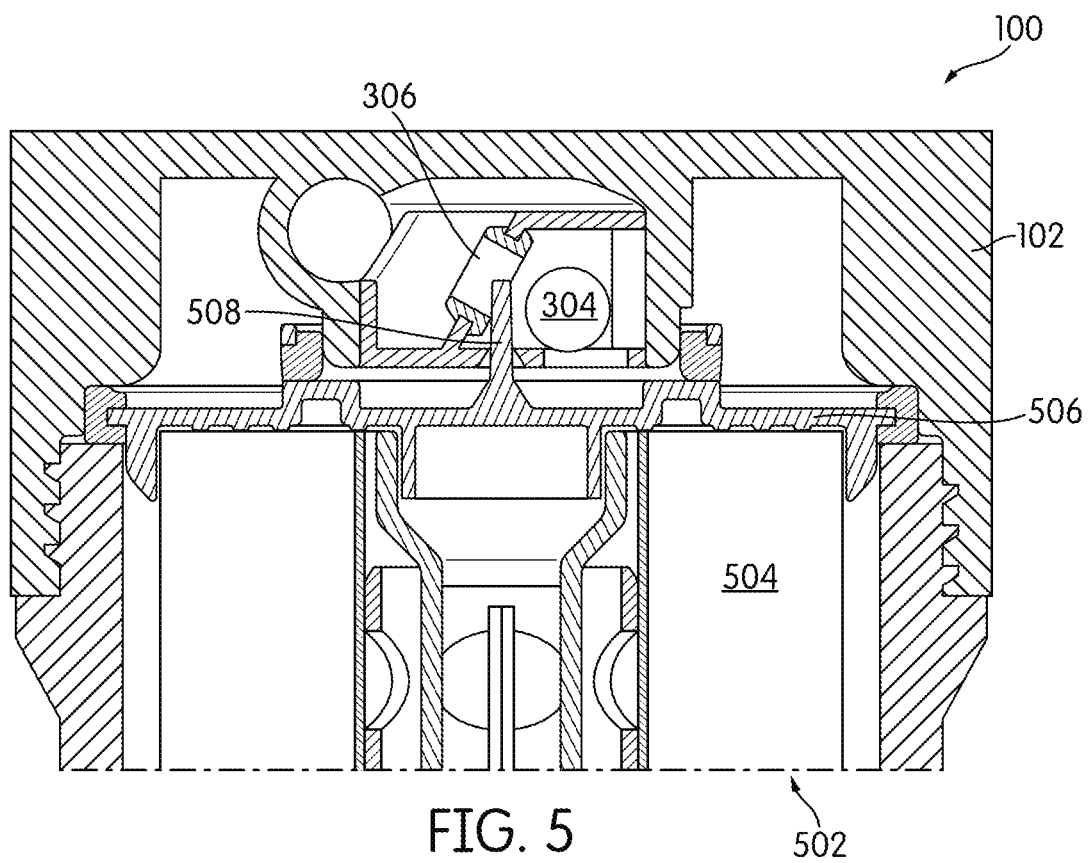
FIG. 5 is a cross-sectional view of the filtration system of FIG. 1A having the no filter no run insert of FIG. 2 inserted and having a genuine or authorized filter element inserted.

Referring to FIG. 5, a cross-sectional view of the filtration system 100 having the no filter no run insert 200 inserted and having a filter element 502 is shown. The filter element 502 is received within the housing 103 of the filtration system. The filter element 502 includes a filter media 504 and a top endcap 506. The filter element 502 is an authorized or genuine filter element. Accordingly, the top endcap 506 includes a pin 508. The pin 508 is a valve interaction pin. The pin 508 interacts with the ball 304 of the no filter no run insert 200. The pin 508 prevents the ball 304 from flowing into and blocking the fluid passage 306 by dislocating the ball away from the fluid passage 306. Accordingly, filtered fluid is permitted to flow from out of the filtration system 100 via the fluid passage 306 (e.g., to an internal combustion engine).

Figure 6:
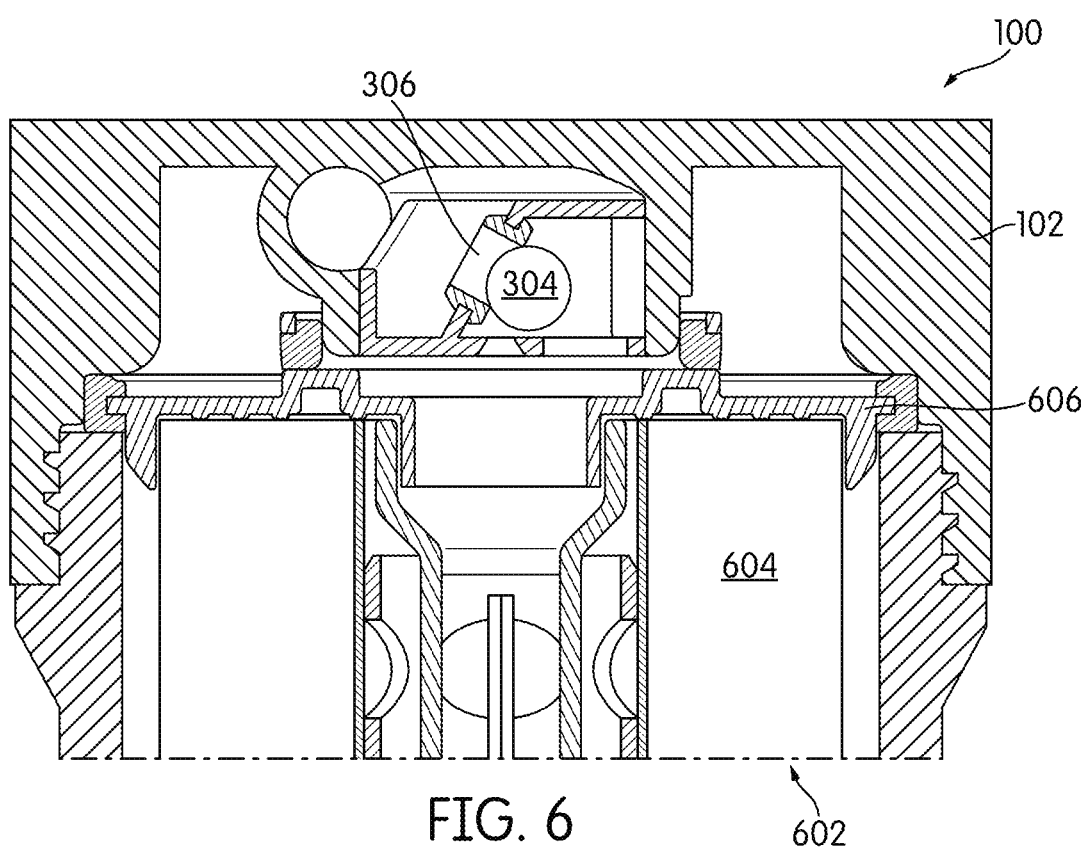
FIG. 6 is a cross-sectional view of the filtration system of FIG. 1A having the no filter no run insert of FIG. 2 inserted and having a non-genuine or unauthorized filter element inserted.

Referring to FIG. 6, a cross-sectional view of the filtration system 100 having the no filter no run insert 200 inserted and having a filter element 602 is shown. The filter element 602 is similar to the filter element 502 of FIG. 5. Accordingly, the filter element 602 includes a filter media 604 and a top endcap 606. Unlike filter element 502, filter element 602 is an unauthorized or non-genuine filter element. Accordingly, the top endcap 606 does not include a projection (e.g., pin 508) that interacts with the ball 304 of the no filter no run insert 200. As fluid flows through the filtration system 100, the fluid pressure forces the ball 304 into the fluid passage 306, thereby choking the fluid flow out of the fluid outlet 108. Accordingly, the system receiving filtered fluid from the filtration system 100 (e.g., an internal combustion engine) cannot operate with the filter element 602.

Figure 7:
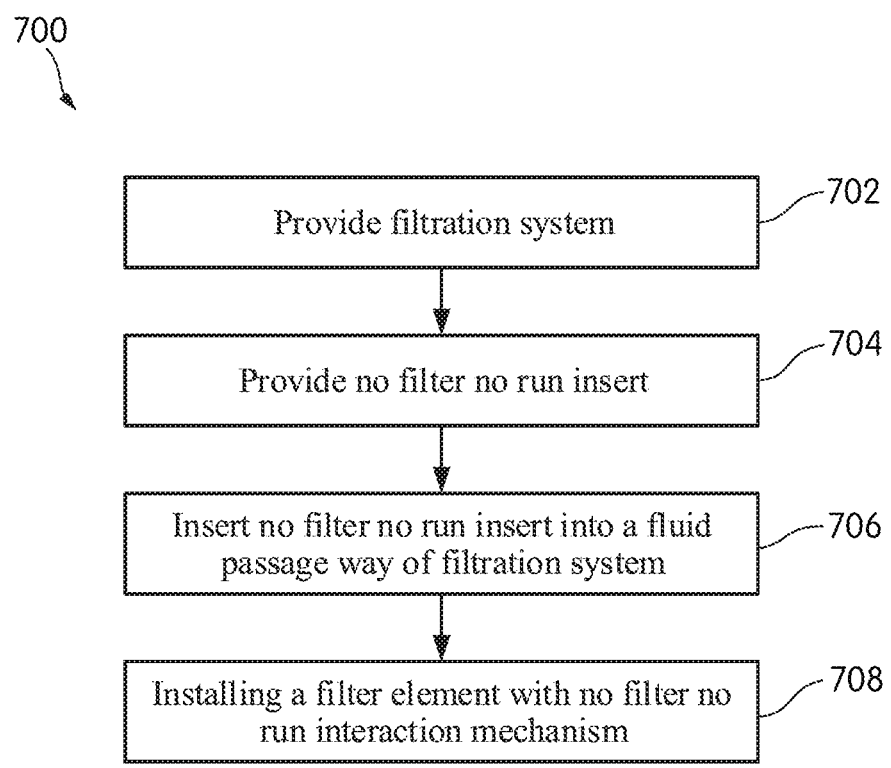
FIG. 7 is a flow diagram of a method of converting a filtration system to a no filter no run filtration system is shown according to an example embodiment.

Referring to FIG. 7, a flow diagram of a method 700 of converting a filtration system to a no filter no run filtration system is shown according to an example embodiment. The method 700 begins when a filtration system is provided at 702. In some arrangements, the filtration system does not include a no filter no run feature, such as a valve in a fluid outlet. The filtration system may include the filter assembly 100. A no filter no run insert is provided at 704. In some arrangements, the no filter no run insert is the no filter no run insert 200. The no filter no run insert is sized and shaped to fit into a fluid passageway of the filtration system (e.g., into the fluid inlet 106 or into the fluid outlet 108).

The no filter no run insert is inserted into the fluid passageway of the mounting head of the filtration system at 706. The no filter no run insert is inserted into a fluid passageway of the filter mounting head of the filtration system. The no filter no run insert forms a snap fit or friction fit connection between a cage of the no filter no run insert and the fluid passage way of the filter mounting head. The no filter no run insert includes a cutoff valve such that the filtration system only functions properly when an appropriate filter element having a no filter no run interaction mechanism is installed in the filtration system. A filter element with the no filter no run interaction mechanism is installed at 708. The filter element is an authorized or genuine filter element. In some arrangements, the filter element is the filter element 502. The filter element includes a no filter no run interaction mechanism, such as the pin 508. Accordingly, when the filter element is installed in the filtration system, the filter element interacts with the no filter no run insert to allow for fluid to flow through the filtration system.

It should be noted that the terms "example" and "exemplary" as used herein to describe various embodiments are intended to indicate that such embodiments are possible examples, representations, and/or illustrations of possible embodiments (and such term is not intended to connote that such embodiments are necessarily extraordinary or superlative examples).

The terms "connected" and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of converting a filtration system to no filter no run filtration system, the method comprising:
    providing a filtration system that does not include a no filter no run feature;
    providing a no filter no run insert having a cutoff valve; and
    inserting the no filter no run insert into a fluid passageway of a mounting head of the filtration system.

2. The method of claim 1, further comprising installing a filter element in the filtration system, the filter element including a no filter no run interaction mechanism.

3. The method of claim 2, wherein installing the filter element comprises passing a valve interaction pin into the no filter no run insert between a ball and a fluid passage at an outlet of the no filter no run insert so as to substantially prevent the ball from engaging the fluid passage.

4. The method of claim 1, wherein inserting the no filter no run insert into the fluid passageway comprises inserting the no filter no run insert into one of a fluid inlet or a fluid outlet of the mounting head.

5. The method of claim 1, wherein inserting the no filter no run insert into the fluid passageway comprises forming at least one of a snap fit or a friction fit connection between a cage housing of the no filter no run insert and the fluid passageway.

6. The method of claim 1, wherein providing the no filter no run insert comprises:
    providing a cage housing;
    providing the cutoff valve, the cutoff valve comprising a ball and a fluid passage, the ball sized such that the ball cannot pass through the fluid passage; and
    engaging the cutoff valve with the cage housing.

7. The method of claim 6, wherein engaging the cutoff valve with the cage housing comprises inserting the ball into the cage housing between the fluid passage and an inlet of the cage housing upstream of the fluid passage such that the ball is retained between the fluid passage and the inlet.

8. The method of claim 1, wherein inserting the no filter no run insert into the fluid passageway comprises aligning an alignment rib with a slot in the mounting head, the alignment rib extending parallel to a central axis of a cage housing of the no filter no run insert.

9. The method of claim 1, wherein inserting the no filter no run insert into the fluid passageway comprises engaging a cage of the no filter no run insert with the fluid passageway so that an outward facing surface of the cage sits flush with surrounding surfaces of the mounting head.

10. The method of claim 1, wherein inserting the no filter no run insert into the fluid passageway comprises engaging a cage of the no filter no run insert with the fluid passageway so that the cage seals against the mounting head via a plastic to metal interference seal.

11. The method of claim 1, wherein the cutoff valve includes a ball having a ball diameter and a fluid passage having a fluid passage diameter, the ball diameter being greater than the fluid passage diameter such that the ball will block the fluid passage as a fluid being filtered by the filtration system carries the ball into the fluid passage unless a filter element having a valve interaction pin is used within the filtration system.

* * * * *